Patented Oct. 18, 1938

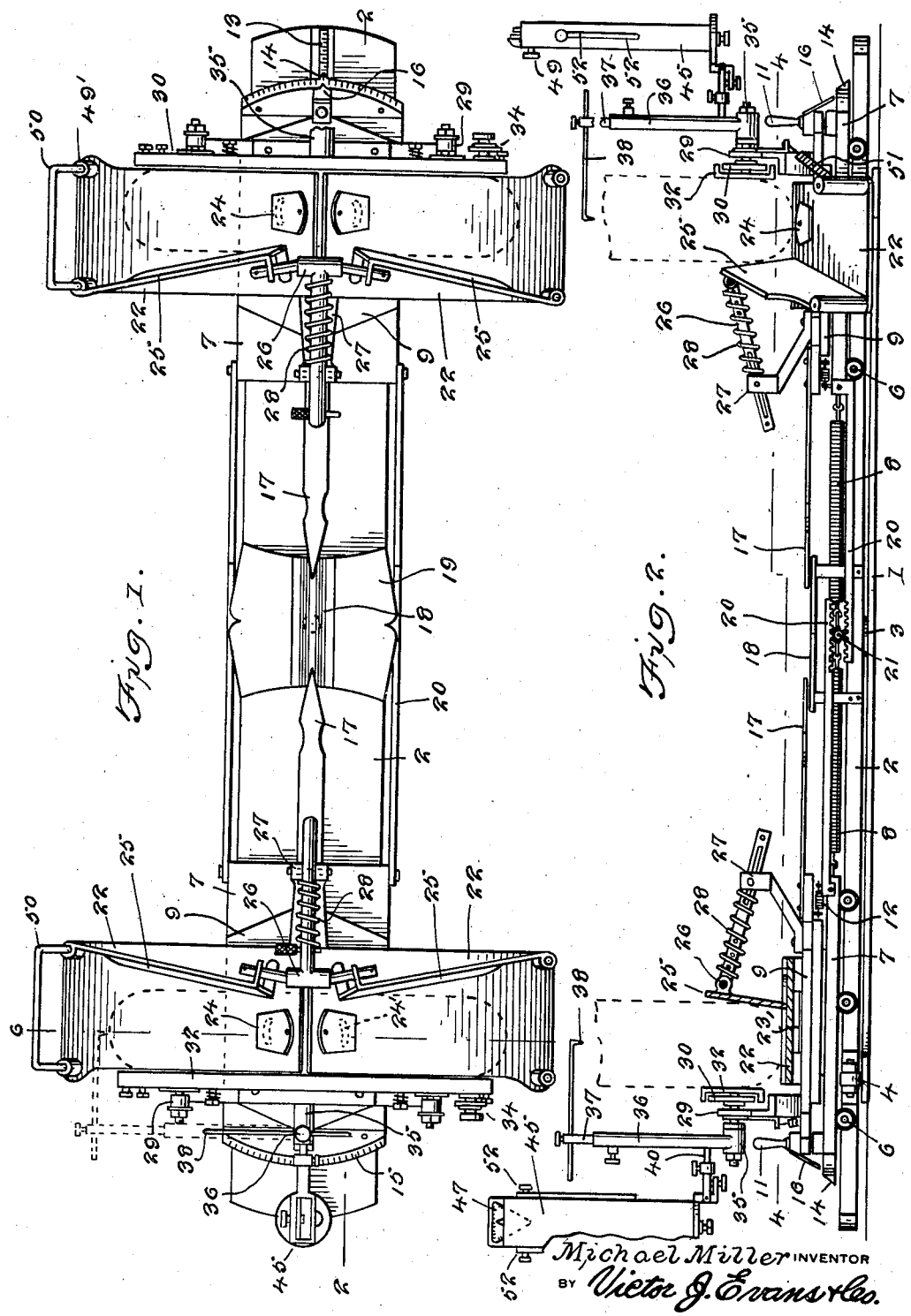

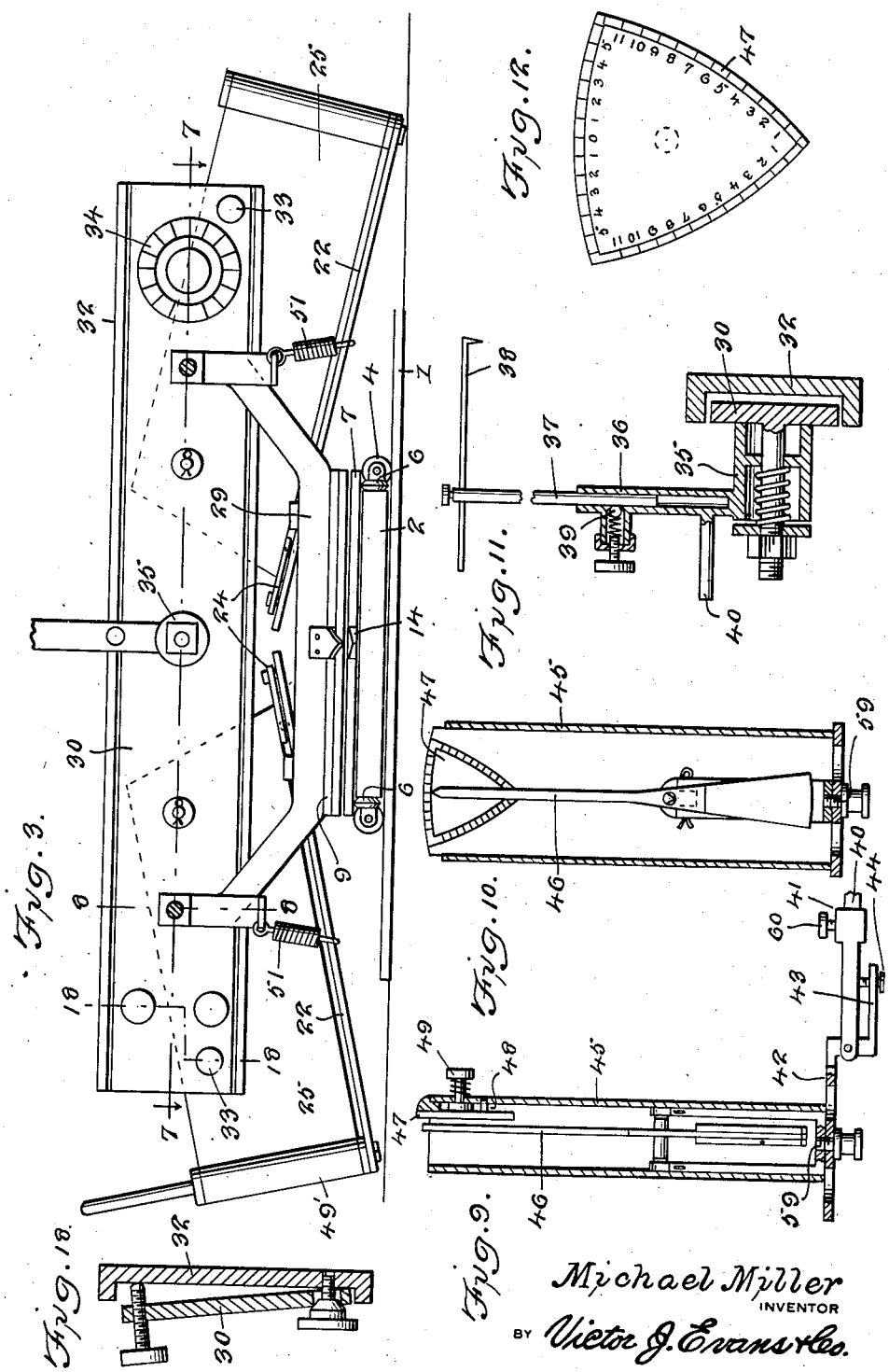

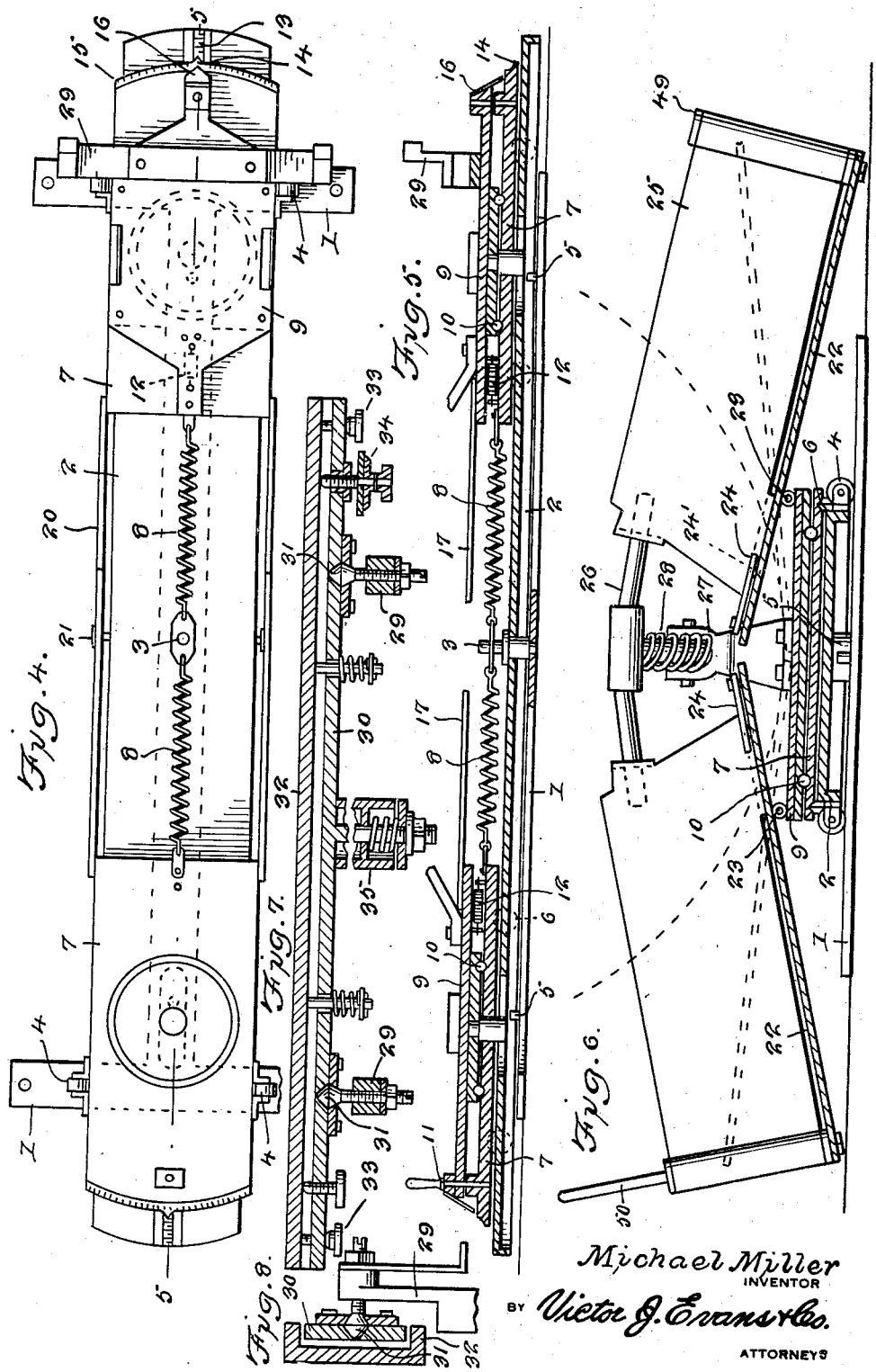

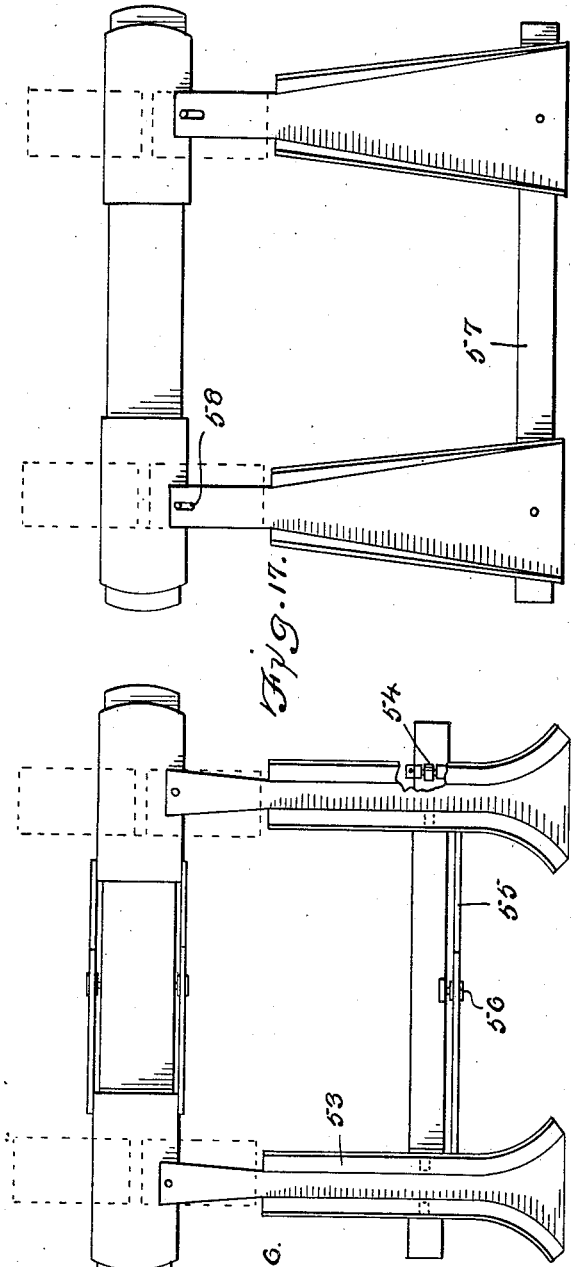

2,133,827

UNITED STATES PATENT OFFICE 2,133,827

WHEEL ALIGNING APPARATUS

Michael Miller, Trenton, N. J.

Application April 15, 1937, Serial No. 137,105

10 Claims. (Cl. 33—203)

This invention relates to an apparatus for gauging wheel alignments of motor vehicles and has for the primary object the provision of a portable device of this character on which a motor vehicle may be easily driven and which will be self-adjusting to the wheels of the vehicle and which will permit a person or the operator of the device to easily and quickly determine toe, camber, and caster of the wheels and to indicate clearly and accurately when the wheels have been trued or brought into proper alignment.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a top plan view illustrating an apparatus for the alignment of motor vehicle wheels constructed in accordance with the present invention.

Figure 2 is a sectional view taken on the line 2—2 of Figure 1.

Figure 3 is a fragmentary end elevation illustrating the device.

Figure 4 is a sectional view taken on the line 4—4 of Figure 2.

Figure 5 is a sectional view taken on the line 5—5 of Figure 4.

Figure 6 is a transverse sectional view taken on the line 6—6 of Figure 1.

Figure 7 is a sectional view taken on the line 7—7 of Figure 3.

Figure 8 is a sectional view taken on the line 8—8 of Figure 3.

Figure 9 is a fragmentary transverse sectional view showing an adjustable indicator.

Figure 10 is a fragmentary vertical sectional view illustrating said indicator.

Figure 11 is a fragmentary vertical view illustrating another indicator.

Figure 12 is a plan view illustrating a scale plate used in connection with the indicator shown in Figures 9 and 10.

Figure 13 is a plan view illustrating a scale plate.

Figure 14 is a plan view illustrating another scale plate.

Figure 15 is a plan view illustrating another scale plate.

Figure 16 is a fragmentary top plan view illustrating the ramp used in connection with this invention.

Figure 17 is a fragmentary top plan view illustrating a modified form of ramp.

Figure 18 is a detail sectional view taken on the line 18—18 of Figure 3.

Referring in detail to the drawings, the numeral 1 indicates a fixed base on which is pivotally mounted for a limited oscillatory movement a supporting member 2, the pivot being shown at 3. The supporting member 2 has journaled thereon rollers 4 which ride on the base 1 and the oscillatory movement of the supporting member is limited by stops 5. Journaled on the supporting member 2 are rollers 6 which slidably support plates 7 and fixed to said plates and to the pivot 3 are coil springs 8. The plates 7 slide endwise of the supporting member and rotatably supported on the plates 7 are turntables 9, anti-friction bearings 10 being provided between the turntables and the slidable plates. Removable pins 11 are provided for releasibly securing the turntables against rotation by engaging in openings formed in the sliding plates. Any rotary movement of the turntables is resisted by coil springs 12. Scale plates 13 are secured on the supporting member and extend longitudinally thereof and the sliding plates carry pointers 14 which cooperate with the scale plates to indicate the amount of sliding movement of the sliding plates during the use of the device. The scale plates 15 are secured on the sliding plates and cooperating therewith are indicators 16 fixed on the turntables. The indicators 16 and scale plates 15 are for the purpose of measuring the movement of the turntables. Opposed indicators 17 are fixed on the turntables and operate in conjunction with a scale 18 of a scale plate 19 suitably mounted on the base. The sliding plates have secured thereto opposed rackbars 20 geared together, as shown at 21, so that movement of one of the sliding plates will be imparted to the other sliding plate.

Hinged on the turntables are opposed tread plates 22, the hinges therefor being indicated at 23. The tread plates normally assume positions, as shown in Figure 6, so that a vehicle may be readily driven upwardly thereon. When the wheels of the vehicle come to rest on the tread plates they assume a dotted line position, as shown in Figure 6.

Tire engaging plates 24 are pivoted on the tread plates 22 adjacent their opposiing ends to be engaged by the tires of the wheels and are provided with anti-friction rollers 24'. Hinged on the tread plates 2 are substantially vertically arranged inner side plates 25 and have slidably connected thereto T-shaped members 26 they being pivotally and slidably mounted on brackets 27 carried by the turn tables. The side plates 25 are to engage with the inner side walls of the tires of the wheels of the vehicle and are influenced in engagement with said tires by coil springs 28. The springs 28 are mounted on the T-shaped members between the head ends thereof and the brackets 27.

Brackets 29 are fixed on the turn-tables and have mounted thereon outer side plates 30. Said outer side plates have a limited movement relative to said brackets by ball and socket joints, indicated at 31. Also the ball and socket joints are adjustably connected onto the brackets 29 permitting the outer side plates to be moved towards and from said brackets. Yieldably connected to the side plates 30 are face or tire engaging plates 32 and may be adjusted relative to the side plates 30 by set bolts 33, one of which has a scale 34 to aid in adjusting the face plates at desired angles to the side plates. It is to be understood that the face plates of the side plates engage with the outer walls of the tires adjacent the lower portions of the tires, the spring influenced inner plates acting to adjust the device so that the face plates contact the side walls of the tire with desirable pressure.

Gauge mountings 35 are rotatably and detachably mounted on the side plates 30 and integral therewith are sleeves 36 to adjustably support posts 37 of scribers 38. The scribers are adjustably mounted on the posts. Spring pressed balls 39 are provided for securing the posts in adjusted positions. Arms 40 are formed on the sleeves 36 and have detachably secured thereto gauge supporting brackets 41 including pivotally connected sections 42 and 43. The sections 42 may be adjusted relative to the sections 43 and held in adjusted positions by set bolts 44. Journaled on the sections 42 are indicator casings 45 each having pivotally mounted therein a weighted pointer 46 operable in relation to a scale plate 47. The casings 45 have the scale plates 47 adjustably mounted thereon and may be held against movement by pins 48 fitting in openings of the casings. Finger pieces 49 are secured to the scale plates whereby said scale plates may be rotated when first moved so as to disengage the pins from the openings in the casings. The scale plates are of substantially triangular shape and have graduations along the edges thereof. The pointers 46 operate in conjunction with the graduations on the scale plates 47. The set bolts 44 permit the casings 45 of the indicators to be adjusted to bring said casings into vertical position. The scale plates 47 and the pointers 46 are employed for obtaining the caster and camber of wheels of a motor vehicle, while the toe of the wheels is obtained through the turning of the turntables with their indicators 17 operating over the scale 18.

Secured on the tread plates 22 adjacent their outer ends are upstanding socketed members 49' to removably receive chocks 50 acting to prevent the vehicle from rolling off of the tread plates during the use of the device. Certain of the socketed members form posts for the inner side plates 25 to hinge on. When the device is non-occupied by the vehicle, the tread plates 22 assume the position shown in full lines in Figure 6 and are supported a slight distance from the floor on which the device rests by springs 51 and when not engaged by wheels of a vehicle they may move down into engagement with the floor so that the vehicle may roll upwardly on to the device. As the wheels of the vehicle come to rest on the tread engaging plates 24, the tread plates 22 assume the dotted line position shown in Figure 6 with their adjacent ends resting upon the turntables. As the wheels roll onto the tread plates and they assume the dotted line position in Figure 6, the inner and outer side plates contact the walls of the tires, as shown in Figure 2, and the sliding plates adjust themselves to the tread or trackage of the wheels, the correct reading of the tread or trackage is given by the pointer 14 on the scale 13. Prior to driving the vehicle onto the device, the front wheels are elevated from the ground and markings are applied to the tires of said wheels, the markings extending circumferentially of the tires and at the centers of the treads of the tires. With the tires thus marked and the vehicle upon the tread plates and the bringing of the scribers to align with said markings first at the back of the wheels and then at the front of the wheels will adjust the outer side plates to the toe of the wheels. The turntables rotating with the swinging of the outer side plates will bring about a toe reading for the wheels by referring to the pointers 16 and scale plates 15, thus permitting the operator to accurately check the toe of the wheels.

To obtain a reading of the camber of the wheels on the device, the plates 32 are adjusted to assume an inclination corresponding to the wheel camber through the adjustment of the set bolts 33 and 34. The butt ends or non-pointed ends of the scribers are then brought into engagement with the upper portions of the tires against the side walls of the latter. The adjustment of the plates 32 and the scribers as described causes the indicator casings to tilt at inclinations corresponding to the camber of the wheels and as the pointers thereof are weighted and the scale plates of the casings moving relative to said weighted pointers gives a correct reading of the wheel camber. The indicator casings when making the camber readings are positioned as shown at the left hand side of Figure 2, that is, with the scale plates facing forwardly and the person or operator making the reading facing the front of the vehicle. After obtaining a reading of the camber of the wheels and it is desired to obtain a caster reading of the wheels, the indicator casings 45 are adjusted to assume the position, as shown at the right hand side of Figure 2, that is, the scale plates being read by the operator standing facing the side of the vehicle. The indicator casings are then adjusted to bring about a zero reading upon their scales by operating the adjusting bolts 44. In other words, the indicator casings are brought to assume vertical positions to obtain the zero reading. The indicator casings are then turned to face rearwardly of the vehicle. The wheels of the vehicle are then steered to the right and then to the left and with the operator standing first at one side and then at the other side of the vehicle to note the caster of the wheels by reading the positions assumed by the weighted pointers on the scale plates 47.

Whenever it is desired to lock the turntables against rotation in either direction, the pins 11 are brought into the openings of the sliding tables or plates 7. The sliding plates 7 and the turntables mounted as described will permit the tread plates to readily adjust themselves properly to the trackage of the wheels as said wheels roll onto the tread plates and as the wheels come to rest on the tire engaging plates 24 they will permit the inner side plates to shift the sliding plates 7 so that the outer side plates engage the outer side walls of the tires. The inner side plates being spring pressed will readily bring about this adjustment. The inner side plates may be termed presser plates to bring about the last referred to adjustment.

Figures 52 are pivotally mounted on the indicator casings 45 and may be positioned to parallel said casings or to extend at right angles thereto. To obtain correct readings on this device it is important that the tires of the wheels contain the same amount of air pressure and in order that this reading be obtained with the use of my invention, either one of the indicator casings is removed from the device and rested on some part of the device and with one of the fingers occupying a right angle position to the casing is brought into engagement with the hub of the wheel and the other finger brought into engagement with the wall of the tire at the lower porion of the tire. A certain reading will then be given on the scale in accordance with the inclination of the indicator casing. Noting this reading and carrying out the same operation on the other wheels the operator can readily determine if the tires carry the same air pressure. If not, the tire having the most air therein can be deflated until its air pressure agrees with the air pressure of the other tires.

Ramps 53 may be pivoted on certain of the tread plates and slidably connected, as shown at 54, and further connected by rack bars 55 geared together, as shown at 56. The ramps when engaged by the wheels will readily adjust themselves to the trackage of the wheels. Instead of having the ramps adjustably connected together as described, they may be pivoted onto a connecting bar 57 and each have a pin and slot connection 58 to its respective tread plate, this form of the invention being shown in Figure 17.

The indicator casings 45 are rotatably and detachably connected to the sections 42 of the adjustable arms 41, as shown at 59. The adjusting arms 41 are detachably connected to the arms 40, as shown at 60.

The tire engaging plates 32 being yieldably and adjustably mounted on the side plates 30 will permit said side plates to be accurately adjusted to the camber of the wheels regardless of defects occurring on the walls of the tires.

What is claimed is:

1. A machine of the character set forth comprising a base, an elongated supporting member pivoted on said base intermediate the ends thereof and having a limited pivotal movement relative to said base and provided with scales extending longitudinally thereof, plates slidably mounted on the supporting member and movable endwise of the latter and having scales and pointers with said pointers movable over the first-named scales, turntables mounted on said plates and including pointers movable over the second named scales, ramp plates carried by the turntables to be engaged by wheels of a vehicle, presser plates carried by the ramp plates and engageable with side walls of tires of the wheels, adjustable side plates carried by the ramp plates to engage walls of the tires of the wheels opposite to the presser plates and adapted to be adjusted to incline in a plane corresponding to the camber of the wheels, and indicators connected with and actuated by said adjustable side plates.

2. A machine of the character set forth comprising a base, an elongated supporting member pivoted on said base intermediate the ends thereof and having a limited pivotal movement relative to said base and provided with scales extending longitudinally thereof, plates slidably mounted on the supporting member and movable endwise of the latter and having scales and pointers with said pointers movable over the first named scales, turntables mounted on said plates and including pointers movable over the second named scales, ramp plates carried by the turntables to be engaged by wheels of a vehicle, presser plates carried by the ramp plates and engageable with side walls of tires of the wheels, adjustable side plates carried by the ramp plates to engage walls of the tires of the wheels opposite to the presser plates and adapted to be adjusted to incline in a plane corresponding to the camber of the wheels, indicators connected with and actuated by said adjustable side plates, and adjustable scribers carried by the adjustable side plates for cooperation with markings made on the tires of the wheels.

3. A machine of the character set forth comprising a base, an elongated supporting member pivoted on said base for a limited pivotal movement relative thereto and having scales, plates slidably mounted on the supporting member and movable endwise of the latter and having scales and pointers and said pointers movable over the first-named scales, turntables mounted on said plates and including pointers movable over the second named scales, ramp plates hinged on the turntables to be engaged by wheels of a vehicle, tension presser plates carried by the ramp plates to engage with side walls of tires of the wheels, adjustable gauge plates carried by the ramp plates to engage walls of the tires of the wheels opposite to said presser plates and adapted to be adjusted to incline in a plane corresponding to the camber of the wheels and pendulum type indicators connected with the adjustable gauge plates and actuated by the latter.

4. A machine of the character set forth comprising a base, an elongated supporting member pivoted on said base for a limited pivotal movement relative thereto and having scales, plates slidably mounted on the supporting member and movable endwise of the latter and having scales and pointers and said pointers movable over the first-named scales, turntables mounted on said plates and including pointers movable over the second named scales, ramp plates hinged on the turntables to be engaged by wheels of a vehicle, tension presser plates carried by the ramp plates to engage with side walls of tires of the wheels, adjustable gauge plates carried by the ramp plates to engage walls of the tires of the wheels opposite to the presser plates and adapted to be adjusted to incline in a plane corresponding to the camber of the wheels, pendulum type indicators connected with the adjustable gauge plates and actuated by the latter, and means for adjusting the indicators to bring them into perpendicular position.

5. A machine of the character set forth comprising a base, an elongated supporting member pivoted on said base for a limited pivotal movement relative thereto and having scales, plates slidably mounted on the supporting member and movable endwise of the latter and having scales and pointers and said pointers movable over the first named scales, turntables mounted on said plates and including pointers movable over the second-named scales, ramp plates hinged on the turntables to be engaged by wheels of a vehicle, tension presser plates carried by the ramp plates to engage with side walls of tires of the wheels, adjustable gauge plates carried by the ramp plates to engage walls of the tires of the wheels opposite to the presser plates and adapted to be adjusted to incline in a plane corresponding to the camber of the wheels, pendulum type indicators connected with the adjustable gauge plates and actuated by the latter, means for adjusting the indicators to bring them into perpendicular position, and rack bars secured to the first named plates and geared together.

6. A machine of the character set forth comprising a base, an elongated supporting member pivoted on said base for a limited pivotal movement relative thereto and having scales, plates slidably mounted on the supporting member and movable endwise of the latter and having scales and pointers and said pointers movable over the first named scales, turntables mounted on said plates and including pointers movable over the second-named scales, ramp plates hinged on the turntables to be engaged by wheels of a vehicle, tension presser plates carried by the ramp plates to engage with side walls of tires of the wheels, adjustable gauge plates carried by the ramp plates to engage walls of the tires of the wheels opposite to the presser plates and adapted to be adjusted to incline in a plane corresponding to the camber of the wheels, pendulum type indicators connected with the adjustable gauge plates and actuated by the latter, means for adjusting the indicators to bring them into perpendicular position, rack bars secured to the first named plates and geared together, and springs connecting said first named plates.

7. A machine of the character set forth comprising a base, an elongated supporting member pivoted on said base for a limited pivotal movement relative thereto and having scales, plates slidably mounted on the supporting member and movable endwise of the latter and having scales and pointers and said pointers movable over the first named scales, turntables mounted on said plates and including pointers movable over the second named scales, ramp plates hinged on the turntables to be engaged by wheels of a vehicle, tension presser plates carried by the ramp plates to engage with side walls of tires of the wheels, adjustable gauge plates carried by the ramp plates to engage walls of the tires of the wheels opposite to the presser plates and adapted to be adjusted to incline in a plane corresponding to the camber of the wheels, pendulum type indicators connected with the adjustable gauge plates and actuated by the latter, means for adjusting the indicators to bring them into perpendicular position, rack bars secured to the first named plates and geared together, springs connected on said first-named plates, and springs connected on said turntables.

8. A machine of the character set forth comprising a base, an elongated supporting member pivoted on said base for a limited pivotal movement relative thereto and having scales, plates slidably mounted on the supporting member and movable endwise of the latter and having scales and pointers and said pointers movable over the first-named scales, turntables mounted on said plates and including pointers movable over the second named scales, ramp plates hinged on the turntables to be engaged by wheels of a vehicle, tension presser plates carried by the ramp plates to engage with side walls of tires of the wheels, adjustable gauge plates carried by the ramp plates to engage walls of the tires of the wheels opposite to the presser plates and adapted to be adjusted to incline in a plane corresponding to the camber of the wheels, pendulum type indicators connected with the adjustable gauge plates and actuated by the latter, means for adjusting the indicators to bring them into perpendicular position, rack bars secured to the first named plates and geared together, springs connected on said first named plates, springs connected on said turntables, anti-friction means between the first named plates and the supporting member, and anti-friction means between the turntables and the first-named plates.

9. A machine of the character set forth comprising a base, an elongated supporting member pivoted on said base for a limited pivotal movement relative thereto and having scales, plates slidably mounted on the supporting member and movable endwise of the latter and having scales and pointers and said pointers movable over the first named scales, turntables mounted on said plates and including pointers movable over the second named scales, ramp plates hinged on the turntables to be engaged by wheels of a vehicle, tension presser plates carried by the ramp plates to engage with side walls of tires of the wheels, adjustable gauge plates carried by the ramp plates to engage walls of the tires of the wheels opposite to the presser plates and adapted to be adjusted to incline in a plane corresponding to the camber of the wheels, pendulum type indicators connected with the adjustable gauge plates and actuated by the latter, means for adjusting the indicators to bring them into perpendicular position, rack bars secured to the first named plates and geared together, springs connected on said first named plates, springs connected on said turntables, anti-friction means between the first-named plates and the supporting member, anti-friction means between the turntables and the first named plates, and auxiliary ramps connected on said ramp plates.

10. A machine of the character set forth comprising a base, an elongated supporting member pivoted on said base for a limited pivotal movement relative thereto and having scales, plates slidably mounted on the supporting member and movable endwise of the latter and having scales and pointers and said pointers movable over the first named scales, turntables mounted on said plates and including pointers movable over the second named scales, ramp plates hinged on the turntables to be engaged by wheels of a vehicle, tension presser plates carried by the ramp plates to engage with side walls of tires of the wheels, adjustable gauge plates carried by the ramp plates to engage walls of the tires of the wheels opposite to the presser plates and adapted to be adjusted to incline in a plane corresponding to the camber of the wheels, pendulum type indicators connected with the adjustable gauge plates and adjusted by the latter, means for adjusting the indicators to bring them into perpendicular position, rack bars secured to the first named plates and geared together, springs connected on said first named plates, springs connected on said turntables, anti-friction means between the first-named plates and the supporting member, anti-friction means between the turntables and the first named plates, auxiliary ramps connected on said ramp plates, and tread plates pivotally and anti-frictionally connected with the ramp plates to be engaged by treads of the tires of the wheels.

MICHAEL MILLER.